(12) United States Patent
Vichare et al.

(10) Patent No.: US 11,308,417 B2
(45) Date of Patent: *Apr. 19, 2022

(54) APPARATUS AND METHOD FOR SYSTEM PROFILE LEARNING IN AN INFORMATION HANDLING SYSTEM

(71) Applicant: DELL PRODUCTS, LP, Round Rock, TX (US)

(72) Inventors: Nikhil M. Vichare, Austin, TX (US); Yan Ning, College Park, MD (US)

(73) Assignee: Dell Products L.P., Rou, TX (US)

( * ) Notice: Subject to any disclaimer, the term of this patent is extended or adjusted under 35 U.S.C. 154(b) by 1251 days.

This patent is subject to a terminal disclaimer.

(21) Appl. No.: 15/594,012

(22) Filed: May 12, 2017

(65) Prior Publication Data
US 2017/0249565 A1 Aug. 31, 2017

Related U.S. Application Data

(63) Continuation of application No. 14/456,842, filed on Aug. 11, 2014, now Pat. No. 9,672,473.

(51) Int. Cl.
*G06N 7/00* (2006.01)
*G06N 20/00* (2019.01)
(Continued)

(52) U.S. Cl.
CPC .......... *G06N 20/00* (2019.01); *G06F 11/008* (2013.01); *G06F 11/079* (2013.01);
(Continued)

(58) Field of Classification Search
CPC .......... G06N 20/00; G06N 5/04; G06N 7/005; G06F 11/3089; G06F 11/0793; G06F 11/079
(Continued)

(56) References Cited

U.S. PATENT DOCUMENTS 7,202,711 B2 4/2007 Gose et al.
8,086,359 B2 12/2011 Spiers et al.
(Continued)

OTHER PUBLICATIONS

Gu et al ("Application of Grey Prediction Model for Failure Prognostics of Electronics" 2010) (Year: 2010).*
(Continued)

*Primary Examiner* — Lut Wong
(74) *Attorney, Agent, or Firm* — Larson Newman, LLP (57) ABSTRACT

An information handling system includes a processing system including a first sensor, and a second sensor, and a management system including an anomaly table, a learned model table entry associated with the processing system and including a learned model and a first sensor data history, and a prediction module to implement a prediction algorithm. The management system is configured to: receive first sensor data and second sensor data, determine an estimate of a first value of the first sensor data using a second value of the second sensor data, determine a residual of the first value by a comparison of the estimate to the first value, determine a significance of the residual, where the significance having a significant value is associated with a predicted anomaly, determine that an anomaly table entry has a known anomaly class for the predicted anomaly, and perform a remediation plan to resolve the predicted anomaly.

17 Claims, 5 Drawing Sheets

(51) Int. Cl.
*G06F 11/30* (2006.01)
*G06F 11/00* (2006.01)
*G06F 11/34* (2006.01)
*G06F 11/07* (2006.01)
*G06N 5/04* (2006.01)

(52) U.S. Cl.
CPC ...... *G06F 11/0709* (2013.01); *G06F 11/0751* (2013.01); *G06F 11/0793* (2013.01); *G06F 11/30* (2013.01); *G06F 11/3058* (2013.01); *G06F 11/3089* (2013.01); *G06F 11/3452* (2013.01); *G06N 5/04* (2013.01); *G06N 7/005* (2013.01)

(58) Field of Classification Search
USPC .......................................................... 706/45
See application file for complete search history.

(56) References Cited

U.S. PATENT DOCUMENTS

| | | |
|---|---|---|
| 8,191,428 B2 | 6/2012 | Harish et al. |
| 2008/0218284 A1 | 9/2008 | Hamann et al. |
| 2008/0294582 A1* | 11/2008 | de Kleer ........ G01R 31/318364 706/46 |
| 2012/0179441 A1 | 7/2012 | Anderson et al. |
| 2013/0013126 A1 | 1/2013 | Salsbery et al. |

OTHER PUBLICATIONS

Hartert et al ("A semi-supervised dynamic version of Fuzzy K-Nearest Neighbours to monitor evolving systems" 2010) (Year: 2010).*
Engelmann et al "Proactive Fault Tolerance Using Preemptive Migration" 2009), (Year: 2009).*
Ibrahim et al ("Thermal Mass Characterization of a Serverat Different Fan Speeds" 2012) (Year: 2012).*
IFixit ("Computer System Cleaning" 2013) (Year: 2013).*
Youssef Bassil ("Expert PC Troubleshooter With Fuzzy-Logic and Self-Learning Support" 2012) (Year: 2012).*
Gu et al. ("Application of Grey Prediction Model for Failure Prognostics of Electronics" 2010).
Hartert et al ("A semi-supervised dynamic version of Fuzzy K-Nearest Neighbours to monitor evolving systems" 2010).
Jardine et al ("A review on machinery diagnostics and prognostics implementing condition-based maintenance" 2006).

* cited by examiner

APPARATUS AND METHOD FOR SYSTEM PROFILE LEARNING IN AN INFORMATION HANDLING SYSTEM

CROSS-REFERENCE TO RELATED APPLICATION

This application is a continuation of U.S. patent application Ser. No. 14/456,842 entitled "Apparatus and Method for System Profile Learning in an Information Handling System," filed on Aug. 11, 2014, now U.S. Pat. No. 9,672,473, Issued Jun. 6, 2017, the disclosure of which is hereby expressly incorporated by reference in its entirety.

FIELD OF THE DISCLOSURE

This disclosure generally relates to information handling systems, and more particularly relates to an apparatus and method for system profile learning in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems. An information handling system can include an embedded controller that provides an interface for the management of resources in the information handling system. An information handling system includes a wide variety of processing elements and devices. An information handling system can employ a management system to manage processing element and device failures.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
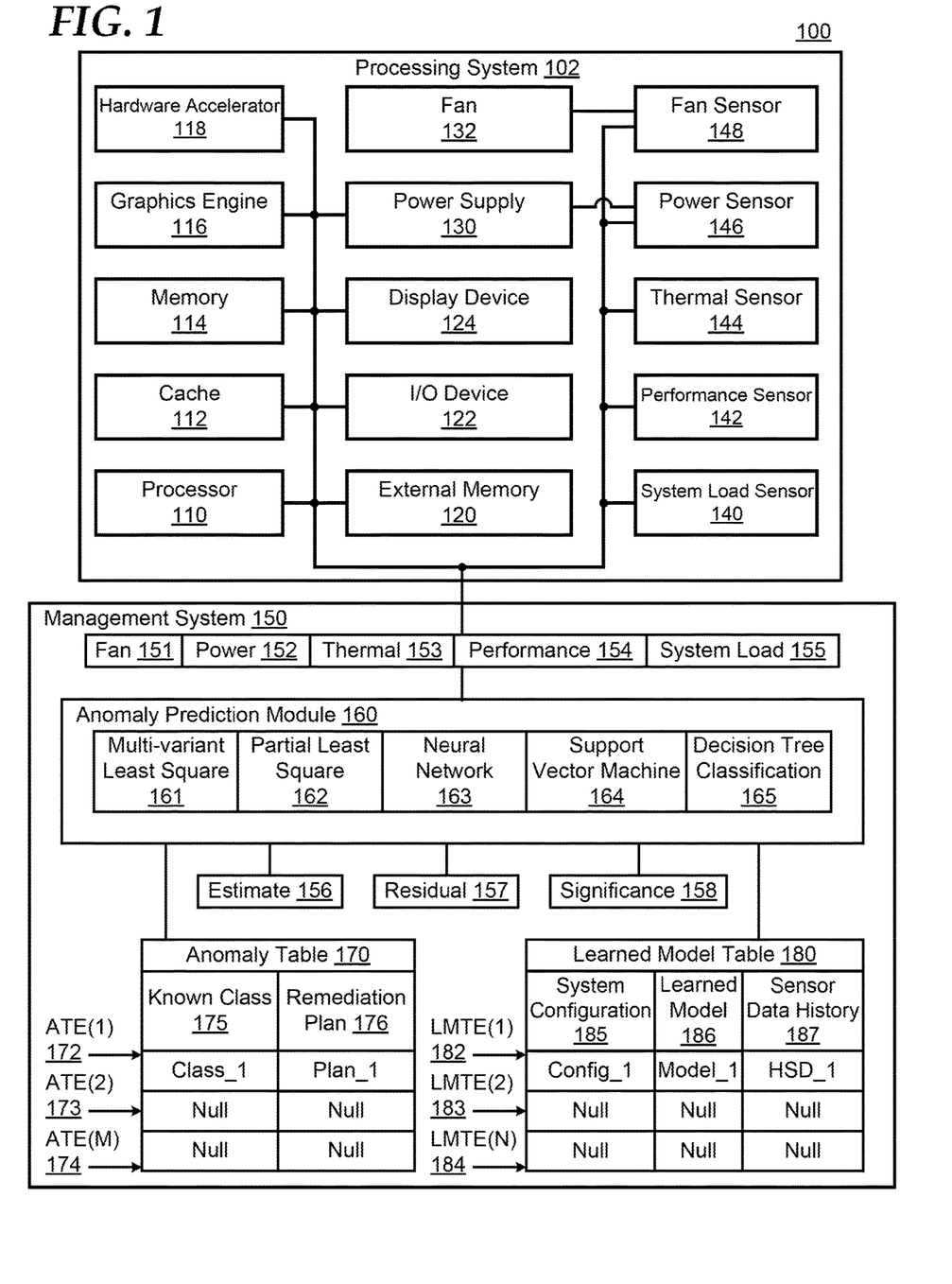
FIG. 1 is a block diagram illustrating an information handling system for system profile learning according to an embodiment of the present disclosure.
Figure 2:
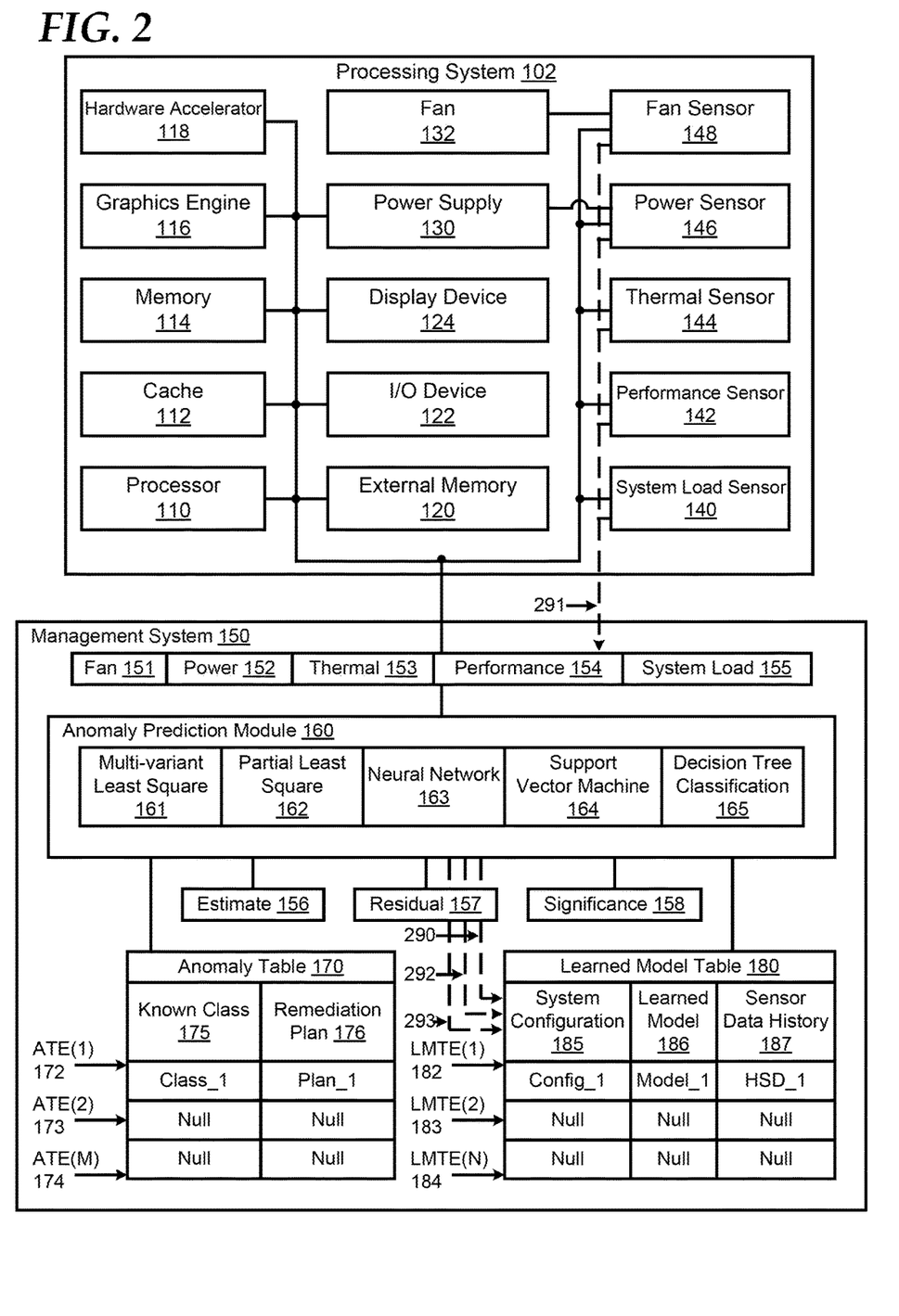
FIG. 2 illustrates the information handling system of FIG. 1 showing an execution flow of initialization of a management system for a processing system.
Figure 3:
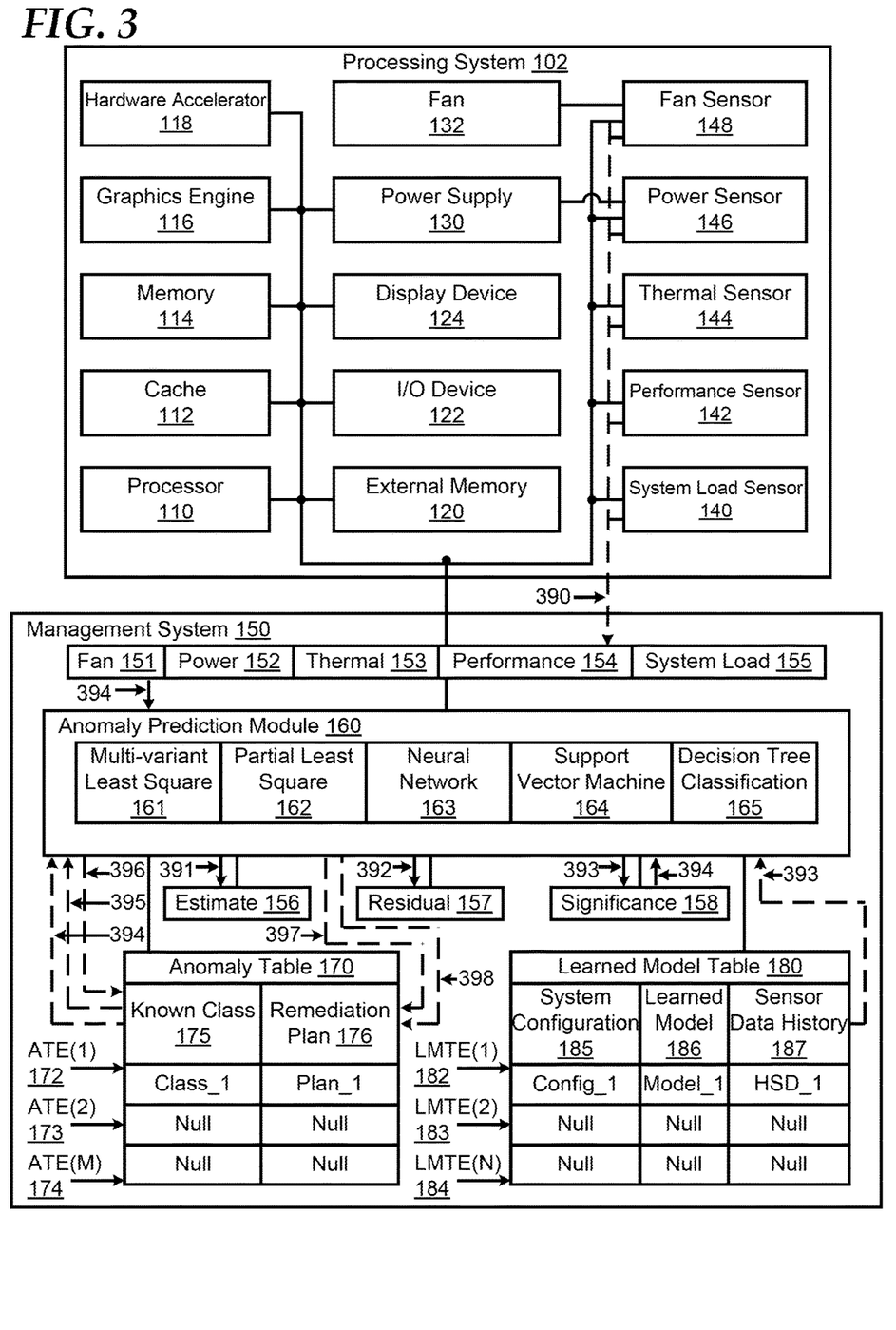
FIG. 3 illustrates the information handling system of FIG. 1 showing an execution flow of system profile learning and anomaly prediction of the processing system by the management system.

FIGS. 1-3 illustrate an information handling system and methods for system profile learning of a processing system to predict an anomaly prior to its occurrence and implement a remediation plan, according to an embodiment of the present disclosure.

FIG. 1 shows an information handling system 100 that includes a processing system 102 connected to a management system 150 that communicate with each other via a communication bus. Information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as a Central Processing Unit (CPU), a Programmable Logic Array (PLA), an embedded device such as a System-On-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various Input and Output (I/O) devices, such as a keyboard, a mouse, and a video display.

Processing system 102 includes a processor 110, a cache 112, a memory 114, a graphics engine 116, a hardware accelerator 118, an external memory 120, an input/output (I/O) device 122, and a display device 124, that communicate with each other via a communication bus, for information handling, a power supply 130 for providing power for processing system 102, a fan 132 for thermal cooling of processing system 102, and sensors for monitoring various aspects of processing system 102, including a system load sensor 140, a performance sensor 142, a thermal sensor 144, a power sensor 146, and a fan sensor 148, as described below.

Management system 150 continuously monitors and receives sensor data from processing system 102 and from one or more additional processing systems similar to processing system 102, for system profile learning, as described below. Management system 150 includes an anomaly prediction module 160, an anomaly table 170, and a learned model table 180. Anomaly prediction module 160 learns system profiles and makes anomaly predictions by gathering sensor data from the managed processing systems, including fan sensor data 151, power sensor data 152, thermal sensor data 153, performance sensor data 154, and system load sensor data 155, to learn correlations between the data over time and to build a learned model for each managed processing system. Anomaly table 170 includes information about known classes of anomalies and associated remediation plans. Learned model table 180 includes information about the system configurations of the managed processing systems, learned models for the managed processing systems, and sensor data history for the managed processing systems. Anomaly prediction module 160 utilizes and maintains the information in both anomaly table 170 and learned model table 180 to learn the correlations between the data, to build and improve accuracy of learned models, to make anomaly predictions, and to resolve anomalies, as described in detail below.

Anomaly table 170 has a plurality of anomaly table entries (ATEs), such as ATE(1) 172, ATE(2) 173, and ATE(M) 174, that are managed by management system 150, where each ATE corresponds to a known anomaly class and M represents the number of known anomaly classes. In a particular embodiment, an anomaly table similar to anomaly table 170 is external to management system 150 and is accessed via a communication bus connected to management system 150 (not shown). Each of the ATEs has anomaly class specific information including a known class 175 and a remediation plan 176. For example, ATE(1) 172 has a class 175 value of Class_1 and a remediation plan 176 value of Plan_1. Examples of known classes of anomalies include an exceeded threshold, an outlier, a processing system degradation, and a processing system failure, such as a thermal trip, a fan failure, a fan rotor lock, a processor throttling, a dust clogged heat-sink, an inlet vent obstruction, a thermal grease degradation, a laptop base feet removal/imbalance, a processing system performance degradation, a sub-optimal processing system-performance/system-loading event, a power over/under current event, an high/low system load condition, and the like. Examples of remediation plans can include a fan replacement, a heat-sink dust removal process, an inlet vent clearing process, a power supply replacement, a re-application of heat-sink thermal grease, a replacement/balancing of laptop base feet, a device replacement, and the like.

Learned model table 180 has a learned model table entry (LMTE) for each one of the managed processing systems, such as LMTE(1) 182 for processing system 102, LMTE(2) 183 for a second processing system, and LMTE(N) for an $N^{th}$ processing system, where N represents the number of managed processing systems. In a particular embodiment, a learned model table similar to learned model table 180 is external to management system 150 and is accessed via a communication bus connected to management system 150 (not shown). Each of the LMTEs has learned model specific information including a system configuration 185, a learned model 186, and a sensor data history 187. For example, LMTE(1) 182 has a system configuration value of Config_1, a learned mode 186 value of Model_1, and a sensor data history 187 value of HSD_1 respectively, described below in more detail.

Anomaly prediction module 160 includes an anomaly prediction algorithm that anomaly prediction module 160 utilizes to make anomaly predictions, further described below. Anomaly prediction module 160 operates to receive new sensor data from processing system 102, to determine an estimate 156 of a specific new sensor data value using one or more other new sensor data values, based on learned model 186 of LMTE(1) 182 for processing system 102, to determine a residual 157 of specific new sensor data value by a comparison of estimate 156 with specific new sensor data value, and to determine a significance 158 of residual 157 by utilizing appropriate statistical methods based on a probability density of specific sensor data history 187 and an accuracy of learned model 186 of LMTE(1) 182. Anomaly prediction module 160 further operates to determine a remediation plan 176 from an ATE, such as ATE(1) 172, in response to determining that significance 158 of residual 157 is significant by comparing new sensor data values to known anomaly classes 175 of anomaly table 170, and, in response to determining a known anomaly class 175, to perform remediation plan 176 of ATE(1) 172 to remediate (resolve) anomaly.

Anomaly prediction module 160 also operates to: define, in response to determining that an anomaly class 175 is unknown for new sensor data values, a new anomaly class 175 for new sensor data values and add new anomaly class 175 to a new ATE of anomaly table 170, and add, in response to determining that new anomaly class 175 leads to an eventual anomaly event, a severity associated with new anomaly class 175 and a new remediation plan to new ATE.

Each of sensors 140-148 provides specific sensor data information. As such, fan sensor 148 provides fan sensor data 151 information, power sensor 146 provides power sensor data 152 information, thermal sensor 144 provides thermal sensor data 153 information, performance sensor 142 provides performance sensor data 154 information, and system load sensor 140 provides system load sensor data 155 information. Examples of fan sensor data 151 information can include a fan speed (rpm), a fan operating state, and the like. Examples of power sensor data 152 information can include a voltage level, a current level, a power supply operating state, and the like. Examples of thermal sensor data 153 information can include a temperature of processor 110 (Central Processing Unit, CPU), cache 112, memory 114, graphics engine 116, hardware accelerator 118, an ambient temperature of processing system 102 and/or specific devices, and the like. Examples of performance sensor data 154 information can include a processor performance, a memory access (read and/or write) performance, an input/output device specific performance, and the like. Examples of system load sensor data 155 information can include a processor utilization, a cache state residency, a memory utilization, a built in operating system (BIOS) log of the processing system, a communication log between the processing system and a remote information handling system, and the like.

Anomaly prediction module 160 learns processing system profiles by determining correlations between specific sensor data values based on learned models 186 and sensor data histories 187. Examples of a determined correlation and an anomaly prediction can include processor temperature and fan operating state to predict a fan failure, processor temperature and fan speed (rpm) to predict a dust heat-sink clogged state, and the like.

Estimate 156, residual 157, and significance 158 are determined by an anomaly prediction algorithm implemented by anomaly prediction module 160, where anomaly prediction algorithm is a machine learning algorithm. Examples of machine learning algorithms can include a multi-variant least square algorithm 161, a partial least square algorithm 162, a neural network algorithm 163, a support vector machine algorithm 164, a decision tree classification algorithm 165, a random forest algorithm (not shown), a naïve Bayes (not shown), and the like, that the anomaly prediction algorithm utilizes alone or in combination thereof to make anomaly predictions. The anomaly prediction algorithm may make a selection to utilize one or more anomaly prediction sub-algorithms based on a processing system service level agreement (SLA), a severity associated with known anomaly class 175, and the like. For example, the anomaly prediction algorithm may select multi-variant least square algorithm 161 to perform a preliminary scan of one or more processing systems because multi-variant least square algorithm execution is fast and low cost, or all anomaly prediction sub-algorithms may be selected to perform anomaly prediction based on processing system service level agreement in place. In such case that more than one anomaly prediction sub-algorithms are selected, anomaly prediction can be based on an ensemble method such as a Bayesian average (voting), a weighted average, a basic average, a rule of succession, other forms of additive smoothing, or the like.

The anomaly prediction algorithm includes an initialization phase that creates LMTEs in learned model table 108 for a processing system, such as LMTE(1) 182 for processing system 102, including system configuration 185, learned model 186, and sensor data history 187, initializes learned model 186, and initializes sensor data history 187 by requesting/receiving an initial sensor data from processing system 102.

The anomaly prediction algorithm further includes an update phase that builds/updates LMTEs in learned model 186 and updates sensor data history from new sensor data, such as LMTE(1) 182. The update phase may further include a method, based on an occurrence of an update event for a processing system, when the LMTEs are updated, where the occurrence of the update event includes at least one of a periodic time interval being met, an operating system upgrade occurrence, an operating system re-image occurrence, and a remediation plan occurrence, to account for an age of the first processing system, a degradation in processing system performance over time, and a processing system wear-out condition over time. Anomaly table can also include pass/fail anomaly criteria, outlier criteria, and the like.

In this manner, anomaly prediction module 160 learns processing system profiles by determining correlations between specific sensor data based on learned models and sensor data histories, makes anomaly predictions, and resolves predicted anomalies without: a requirement for raw sensor data, a requirement for additional sensors, a built in operating system (BIOS) reporting system, additional processing system hardware costs, or an actual system failure event, resulting in remote anomaly detection, processing system fault isolation, fault to failure progression, and information to assist remediation that can be implemented on a low-cost processing system. Anomaly prediction module 160 is also processing system/platform type agnostic and anomaly prediction is based on learned relationships/correlations between each sensor data. This enables early/proactive screening of anomalies, faults, and impending failures instead of waiting for a processing system failure in an unscheduled manner and automated part dispatch and remediation, and enhances end-user productivity.

In an embodiment, management system 150 initializes/configures a LMTE of learned model table 180, when a processing system is initially provisioned and communicates its system configuration to management system 150, by requesting/receiving initial processing system sensor data. Alternatively, management system 150 initializes/configures a LMTE, when no learned model and/or sensor data history is available, by determining a LMTE of a processing system that has the same or a similar system configuration and initializing learned model 186 and sensor data history 187 of processing system from learned model 186 and sensor data history of the same or similar processing system LMTE. Management system 150 may also initialize/configure a LMTE by receiving system configuration 185, learned model 186 and sensor data history 187 from the information handling system or from another information handling system.

In an embodiment, anomaly prediction module 160 updates a learned model 186 of a LMTE for a processing system periodically or after a significant event such as an operating system (OS) upgrade/re-image to account for processing system aging. These learned model 186 updates can be used to determine processing system wear-out/degradation performance over time.

FIG. 2 shows an execution flow of an initialization of management system 150 for a processing system according to an embodiment of the present disclosure. In step 290, management system 150 creates LMTE(1) 182 and adds a system configuration, Config_1, provided by processing system 102, at system configuration 185 of LMTE(1) 182.

In step 291, management system 150 requests the initial sensor data from processing system 102 for a learned model creation and a sensor data history initialization. In step 292, in response to receiving initial sensor data associated with processing system 102, anomaly prediction module 160 creates an initial learned model 186 at LMTE(1) 182, shown as Model_1, based on initial sensor data including fan sensor data 151, power sensor data 152, thermal sensor data 153, performance sensor data 154, and system load sensor data 155. Anomaly prediction model 160 initializes each sensor data history 187 at LMTE(1) 182, depicted as HSD_1 in FIG. 2, utilizing initial sensor data, in step 293.

In an embodiment (step not shown), in response to determining that no initial sensor data and/or no learned model is available, anomaly prediction module 160 finds a LMTE with a processing system that is the same or similar to processing system 102, such as LMTE(N) 184, and initializes learned model 186 and sensor data history 187 at LMTE(1) 182 from learned model 186 and sensor data history 187 at LMTE(N) 184 associated with the same or similar processing system.

FIG. 3 shows an execution flow of system profile learning and an anomaly prediction of processing system 102 by management system 150 according to an embodiment of the present disclosure. In step 390, management system 150 requests new sensor data from processing system 102, where new sensor data is received at fan sensor data 151, power sensor data 152, thermal sensor data 153, performance sensor data 154, and system load sensor data 155.

In step 391, anomaly prediction module 160 estimates, utilizing the anomaly prediction algorithm, estimate 156 of a specific sensor data value, such as fan sensor data 151 value, based on another actual sensor data value, such as thermal sensor data 153 value.

In step 392, anomaly prediction module 160 determines residual 157 of fan sensor data 151 value by comparing estimate 156 to actual fan sensor data 151 value.

In step 393, anomaly prediction module 160 determines significance 158 of residual 157 based on learned model 186 and fan sensor data history 187 for processing system 102 at LMTE(1) 182 of learned model table 180, shown in FIG. 3 as Model_1 and HSD_1, where anomaly prediction module 160 utilizes accuracy of learned model 186 in determining significance 158. Examples of accuracy of learned model 186 includes a number of times learned model 186 has been updated, experimental determination based on the same or a similar processing system to processing system 102, and the like.

In step 394, anomaly prediction module 160 classifies, in response to significance 158 having a significant value, fan sensor data 151 value and thermal sensor data 153 value to a known anomaly class 175 at an ATE of anomaly table 170, such as ATE(1), shown in FIG. 3 as Class_1, by comparing fan sensor data 151 value and thermal sensor data 153 value to known anomaly classes 175. As such, anomaly prediction module 160 predicts an anomaly for processing system 102.

In step 395, anomaly prediction module 160 determines, in response to classifying to known anomaly class 175, a remediation plan 176 from ATE(1) 172, shown in FIG. 3 as Plan_1.

In step 396, anomaly prediction module 160 performs, in response to determining that remediation plan 176 exists, remediation plan to resolve predicted anomaly.

In step 397, anomaly prediction module 160 defines, in response to determining that fan sensor data 151 value and thermal sensor data 153 value do not classify to a known anomaly class, a new class for unknown predicted anomaly and creates/adds new class to an ATE of anomaly table 170, such as ATE(2) 173.

In step 398, anomaly prediction module 160 defines, in response to determining that an remediation plan 176 does not exist in ATE(1) 172, a new remediation plan 176 for new class and adds new remediation plan 176 to ATE(1) 172. Further in response, anomaly prediction module 160 adds a severity associated with new class at known anomaly class 175 of ATE(1) 172.

In an embodiment, anomaly prediction module 160 predicts a clogged heat-sink by: estimating, utilizing multi-variant least square sub-algorithm 161, estimate 156 of a fan speed value of fan sensor data 151 based on an actual processor temperature value of thermal sensor data 153 and a processor utilization value of performance sensor data 154 of a processor of a processing system, determining residual 157 of fan speed value by comparing estimate 156 to actual fan speed value, determining significance 158 of residual 157 based on learned model 186 and sensor data history 187 at a LMTE of learned model table 180 for processing system, where fan speed outlier information and a medium/high fan speed threshold of sensor data history 187 are also utilized in determining significance, classifying, in response to significance 158 having a significant value, fan speed value, processor temperature value and processor utilization value to a known anomaly class 175 at an ATE of anomaly table 170, by comparing fan speed value, processor temperature value and processor utilization value to known anomaly classes 175, where predicted anomaly classifies to known heat-sink anomaly class.

In another embodiment, anomaly prediction module 160 predicts a clogged heat-sink by: estimating, utilizing multi-variant least square sub-algorithm 161, estimate 156 of processor temperature value based on actual fan speed value and actual processor utilization value, determining residual 157 of processor temperature value by comparing estimate 156 to actual processor temperature value, determining significance 158 of residual 157 based on learned model 186 and sensor data history 187 at a LMTE of learned model table 180 for processing system, where processor temperature outlier information and a medium/high fan speed threshold of sensor data history 187 are also utilized in determining significance, classifying, in response to significance 158 having a significant value, processor temperature value, fan speed value and processor utilization value to a known anomaly class 175 at an ATE of anomaly table 170, by comparing processor temperature value, fan speed value and processor utilization value to known anomaly classes 175, where predicted anomaly classifies to known heat-sink anomaly class.

In yet another embodiment, anomaly prediction module 160 predicts a clogged heat-sink by classifying, utilizing decision tree classification sub-algorithm 165, processor utilization value, processor temperature value, and fan speed value to a known anomaly class 175 at an ATE of anomaly table 170, by comparing processor utilization value, processor temperature value, and fan speed value to known anomaly classes 175 that identifies heat-sink state, where heat-sink state is in a clogged state, hence classifies to known heat-sink anomaly class, when:
  i) processor temperature value is High or above and fan speed value is High or above
  ii) processor utilization value is Medium or above, processor temperature value is High or above and fan speed value is High or above
  iii) processor utilization value is Medium or above, processor temperature value is High or above and fan speed value is High or above Low, Medium, High, Very High and Maximum having values based on quartile threshold values as:
  Low: <Q1 (First Quartile)
  Medium: [Q1,Q3] (First Quartile to Third Quartile)
  High: >Q3 or [Q3,Max] (Third Quartile to Maximum)
  Very High: >Maximum (Maximum=Q3+1.5(Q3-Q1)

Figure 4:
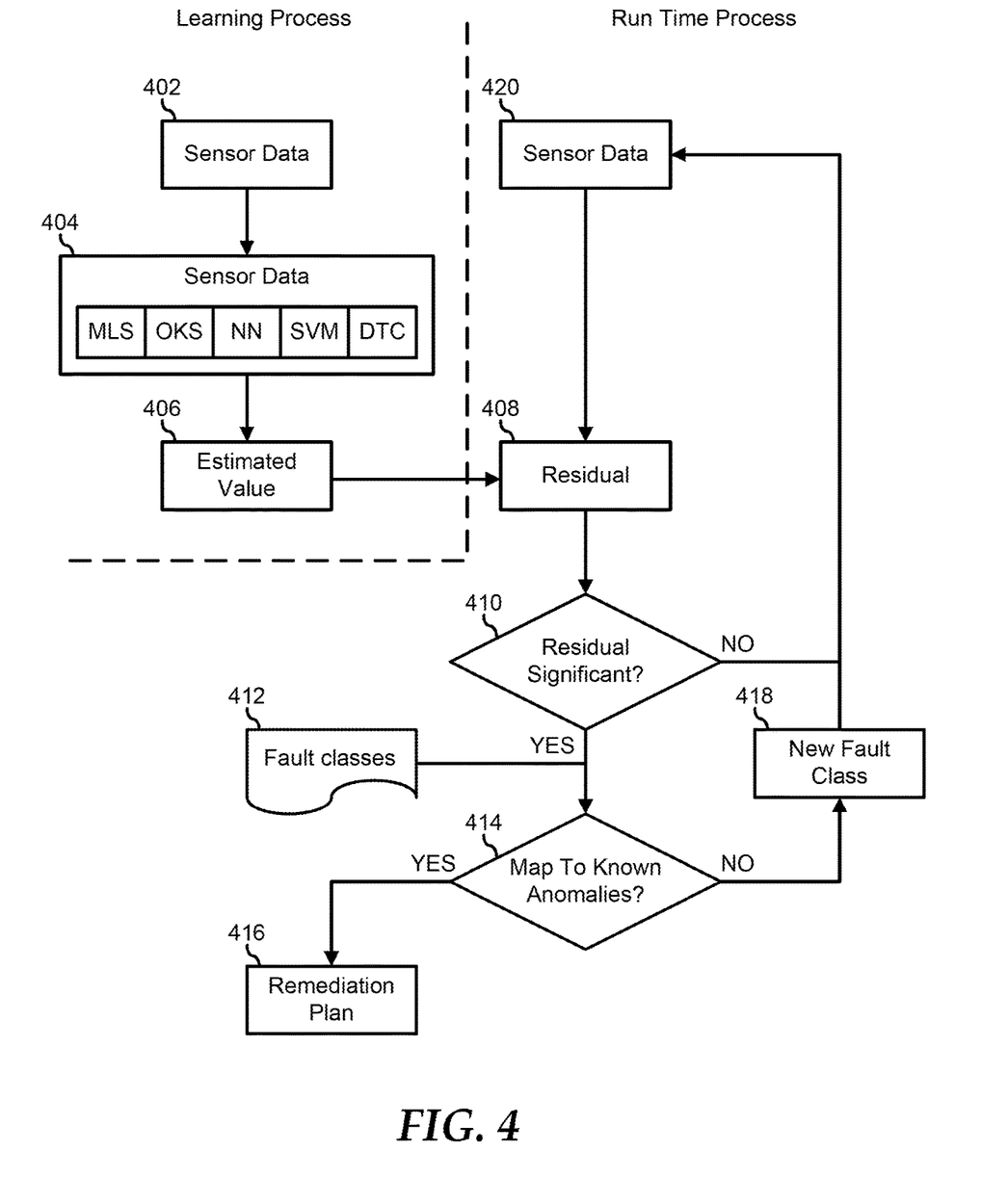
FIG. 4 illustrates a method for system profile learning in an information handling system according to an embodiment of the present disclosure.

FIG. 4 illustrates a method for system profile learning in an information handling system that includes a learning process and a run time process. The learning process begins at step 402 where sensor data is received from an information handling system. The learning process proceeds to step 404 where an estimated value of a specific sensor data value, such as fan sensor data 151 value, utilizing anomaly prediction algorithm, is estimated, based on another actual sensor data value, such as thermal sensor data 153 value. The learning process proceeds to step 406 where estimated value is stored.

The learning process proceeds to step 408 of a run time process and the learning process ends. At step 408, residual 157 of fan sensor data 151 value is determined by comparing estimated value to actual fan sensor data 151 value. The run time process proceeds to step 410 where significance 158 of residual 157 is determined based on learned model 186 and fan sensor data history 187 for information handling system. If residual 157 is significant, the run time process proceeds to step 414. As such, the run time process predicts an anomaly for information handling system. At step 414, the run time process determines if fan sensor data 151 value and thermal sensor data 153 value map (classify) to known anomalies based on fault classes 412, such as known anomaly classes 175 at ATE of anomaly table 170, such as ATE(1), by comparing fan sensor data 151 value and thermal sensor data 153 value to known fault classes 412. If predicted anomaly map (classify) to known anomalies, the run time process proceeds to step 416 where remediation plan 176 from ATE(1) 172 is performed and the run time process ends.

At step 410, if residual 157 is not significant, the run time process proceeds to step 420 where sensor data is received from information handling system. The run time process proceeds to step 408 and proceeds as previously described.

At step 414, if predicted anomaly does not map to known anomalies (is unknown), the run time process proceeds to step 418 where a new fault (anomaly) class is defined for unknown predicted anomaly and adds new class to an ATE of anomaly table 170, such as ATE(2) 173. The run time process proceeds to step 420 and proceeds as previously described.

Figure 5:
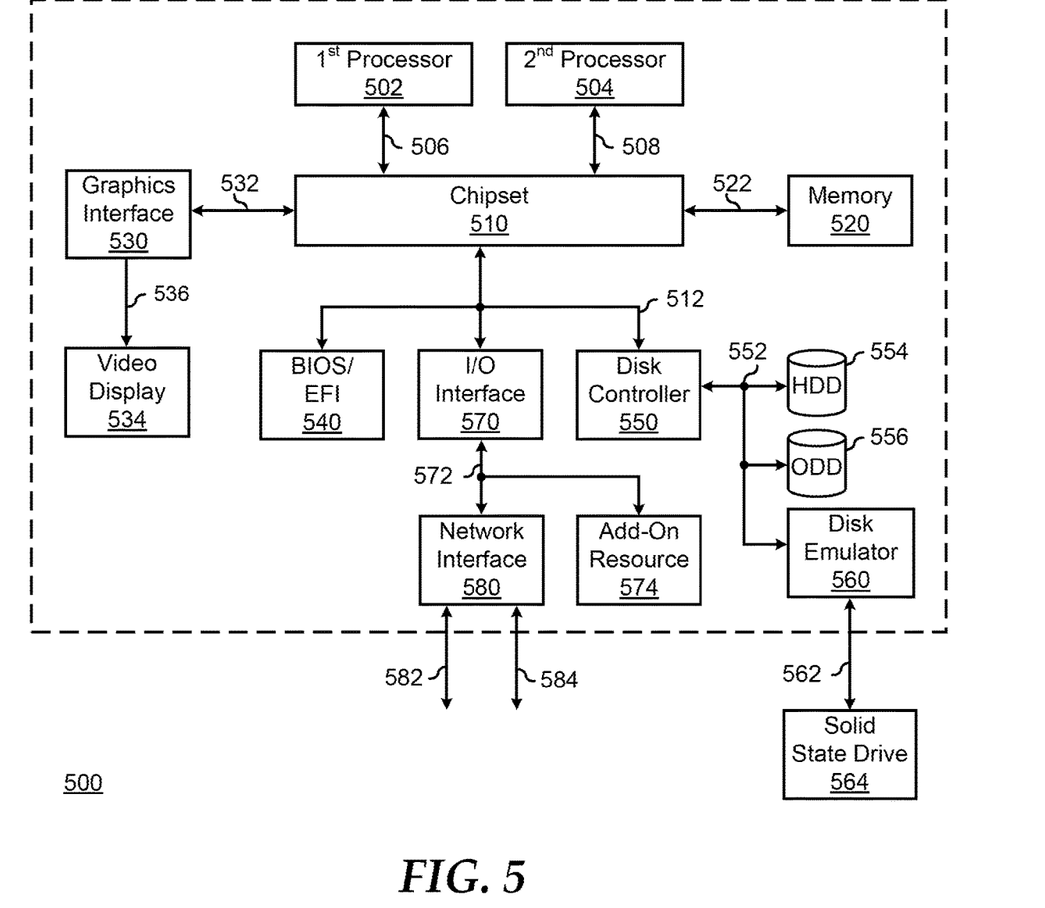
FIG. 5 is a block diagram illustrating a generalized information handling system according to an embodiment of the present disclosure.

FIG. 5 illustrates a generalized embodiment of information handling system 500. For purpose of this disclosure information handling system 500 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 500 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 500 can include processing resources for executing machine-executable code, such as a Central Processing Unit (CPU), a Programmable Logic Array (PLA), an embedded device such as a System-On-a-Chip (SoC), or other control logic hardware. Information handling system 500 can also include one or more computer-readable medium for storing machine-executable code, such as software or data. Additional components of information handling system 500 can include one or more storage devices that can store machine-executable code, one or more communications ports for communicating with external devices, and various Input and Output (I/O) devices, such as a keyboard, a mouse, and a video display. Information handling system 500 can also include one or more buses operable to transmit information between the various hardware components.

Information handling system 500 can include devices or modules that embody one or more of the devices or modules described above, and operates to perform one or more of the methods described above. Information handling system 500 includes processors 502 and 504, a chipset 510, a memory 520, a graphics interface 530, include a Basic Input Output System/Extensible Firmware Interface (BIOS/EFI) module 540, a disk controller 550, a disk emulator 560, an Input/Output (I/O) interface 570, and a network interface 580. Processor 502 is connected to chipset 510 via processor interface 506, and processor 504 is connected to the chipset via processor interface 508. Memory 520 is connected to chipset 510 via a memory bus 522. Graphics interface 530 is connected to chipset 510 via a graphics interface 532, and provides a video display output 536 to a video display 534. In a particular embodiment, information handling system 500 includes separate memories that are dedicated to each of processors 502 and 504 via separate memory interfaces. An example of memory 520 includes Random Access Memory (RAM) such as Static RAM (SRAM), Dynamic RAM (DRAM), Non-Volatile RAM (NV-RAM), or the like, Read Only Memory (ROM), another type of memory, or a combination thereof.

BIOS/EFI module 540, disk controller 550, and I/O interface 570 are connected to chipset 510 via an I/O channel 512. An example of I/O channel 512 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 510 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 540 includes BIOS/EFI code operable to detect resources within information handling system 500, to provide drivers for the resources, initialize the resources, and access the resources. BIOS/EFI module 540 includes code that operates to detect resources within information handling system 500, to provide drivers for the resources, to initialize the resources, and to access the resources.

Disk controller 550 includes a disk interface 552 that connects the disc controller to a Hard Disk Drive (HDD) 554, to an Optical Disk Drive (ODD) 556, and to disk emulator 560. An example of disk interface 552 includes an Integrated Drive Electronics (IDE) interface, an Advanced Technology Attachment (ATA) such as a Parallel ATA (PATA) interface or a Serial ATA (SATA) interface, a SCSI interface, a USB interface, a proprietary interface, or a combination thereof. Disk emulator 560 permits a solid-state drive 564 to be connected to information handling system 500 via an external interface 562. An example of external interface 562 includes a USB interface, an IEEE 1394 (Firewire) interface, a proprietary interface, or a combination thereof. Alternatively, solid-state drive 564 can be disposed within information handling system 500.

I/O interface 570 includes a peripheral interface 572 that connects the I/O interface to an add-on resource 574 and to network interface 580. Peripheral interface 572 can be the same type of interface as I/O channel 512, or can be a different type of interface. As such, I/O interface 570 extends the capacity of I/O channel 512 when peripheral interface 572 and the I/O channel are of the same type, and the I/O interface translates information from a format suitable to the I/O channel to a format suitable to the peripheral channel 572 when they are of a different type. Add-on resource 574 can include a data storage system, an additional graphics interface, a Network Interface Card (NIC), a sound/video processing card, another add-on resource, or a combination thereof. Add-on resource 574 can be on a main circuit board, on separate circuit board or add-in card disposed within information handling system 500, a device that is external to the information handling system, or a combination thereof.

Network interface 580 represents a NIC disposed within information handling system 500, on a main circuit board of the information handling system, integrated onto another component such as chipset 510, in another suitable location, or a combination thereof. Network interface device 580 includes network channels 582 and 584 that provide interfaces to devices that are external to information handling system 500. In a particular embodiment, network channels 582 and 584 are of a different type than peripheral channel 572 and network interface 580 translates information from a format suitable to the peripheral channel to a format suitable to external devices. An example of network channels 582 and 584 includes InfiniBand channels, Fibre Channel channels, Gigabit Ethernet channels, proprietary channel architectures, or a combination thereof. Network channels 582 and 584 can be connected to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
   a processing system including:
      a first hardware sensor configured to provide first sensor data; and
      a second hardware sensor configured to provide second sensor data; and
   a management system coupled to the processing system and including:
      an anomaly table;
      a learned model table entry associated with the processing system and including a learned model and a first sensor data history; and
      a prediction module to implement a prediction algorithm; and
   wherein the management system is configured to:
      receive the first sensor data and the second sensor data;
      determine, based on the prediction algorithm and the learned model, an estimate of a first value of the first sensor data using a second value of the second sensor data;
      determine a residual of the first value by a comparison of the estimate to the first value;
      determine, based on the learned model and the first sensor data history, a significance of the residual, wherein the significance having a significant value is associated with a predicted anomaly;
      determine that an anomaly table entry in the anomaly table has a known anomaly class for the predicted anomaly, based on the first value, the second value, and known anomaly classes in the anomaly table, in response to the significance having the significant value;
      perform a remediation plan of the anomaly table entry to resolve the predicted anomaly in response to determining the known anomaly class, wherein the remediation plan includes at least one of: a heat-sink dust removal process;
      an inlet vent clearing process; and a re-application of heat-sink thermal grease; and wherein the remediation plan further includes: a fan replacement; a replacement/balancing of laptop base feet; and a device replacement;
      define a new anomaly class for the predicted anomaly in response to determining that the predicted anomaly has an unknown anomaly class;
      add the new anomaly class to a new anomaly table entry in the anomaly table; and
      add a severity and a remediation plan to the new anomaly table entry.

2. The information handling system of claim 1, wherein the management system is further configured to:
   update the learned model to account for at least one of an age of the processing system, a degradation in processing system performance, and a processing system wear-out condition.

3. The information handling system of claim 1, wherein the first hardware sensor and the second hardware sensor includes at least one of a fan sensor, a power sensor, a thermal sensor, a performance sensor, and a system load sensor.

4. The information handling system of claim 1, wherein the first sensor data and the second sensor data includes at least one of a fan speed, a fan operating state, a voltage level, a current level, a power supply operating state, a temperature of the processing system, the temperature of a device, an ambient temperature of the processing system, the ambient temperature of the device, a processor performance, a memory access performance, an input/output device performance, a processor utilization, a cache state residency, a memory utilization, a built in operating system (BIOS) log of the processing system, and a communication log between the processing system and a remote information handling system.

5. The information handling system of claim 1, wherein the prediction algorithm includes a machine learning algorithm.

6. The information handling system of claim 5, wherein the prediction algorithm further includes a Bayesian average, a weighted average, a basic average, a rule of succession, and other forms of additive smoothing.

7. The information handling system of claim 1, wherein:
   the predicted anomaly includes a clogged heat-sink;
   the first hardware sensor includes a fan sensor configured to provide a fan speed of a fan;
   the second hardware sensor includes a thermal sensor configured to provide a processor temperature of a processor;
   the processing system further includes a performance sensor configured to provide a processor utilization of the processor;
   the first sensor data history includes a fan sensor data history;
   the prediction algorithm includes a multi-variant least square algorithm; and
   the management system is further configured to:
      receive the fan speed, the processor temperature, and the processor utilization; and determine, based on the multi-variant least square algorithm and the learned model, the estimate of the fan speed using the processor temperature and the processor utilization;

wherein:

determining the significance further includes utilizing fan speed outlier information and fan speed threshold information from the fan sensor data history; and determining that the anomaly table entry has the known anomaly class for the clogged heat-sink is further based on the fan speed, the processor temperature, the processor utilization, and the known anomaly classes in the anomaly table.

8. A method comprising:

providing, by a processing system of an information handling system, first sensor data from a first sensor of the processing system to a management system of the information handling system;

providing, by the processing system, second sensor data from a second sensor of the processing system to the management system;

determining, by a prediction module of the management system, based on a prediction algorithm and a learned model of a learned model table entry associated with the processing system, an estimate of a first value of the first sensor data using a second value of the second sensor data;

determining, by the prediction module, a residual of the first value by a comparison of the estimate to the first value;

determining, by the prediction module, a significance of the residual, based on the learned model and a first sensor data history of the learned model table entry, wherein the significance having a significant value is associated with a predicted anomaly;

determining, by the prediction module, that an anomaly table entry in an anomaly table has a known anomaly class for the predicted anomaly, based on the first value, the second value, and known anomaly classes in the anomaly table, in response to the significance having a significant value;

performing, by the prediction module, a remediation plan of the anomaly table entry to resolve the predicted anomaly in response to determining the known anomaly class, wherein the remediation plan includes at least one of: a heat-sink dust removal process; an inlet vent clearing process; and a re-application of heat-sink thermal grease; and wherein the remediation plan further includes; a fan replacement; a replacement/balancing of laptop base feet; and a device replacement; and receiving, by the management system, third sensor data from a third sensor of the processing system, wherein the first sensor data includes a fan speed of a fan, the second sensor data includes a processor temperature of a processor, the third sensor data includes a processor utilization of the processor, and the predicted anomaly includes a clogged heat-sink and the remediation plan includes a heat-sink dust removal process.

9. The method of claim 8, further comprising:

defining, by the prediction module, a new anomaly class for the predicted anomaly in response to determining that the predicted anomaly has an unknown anomaly class;

adding, by the prediction module, the new anomaly class to a new anomaly table entry in the anomaly table; and adding, by the prediction module, a severity and a remediation plan to the new anomaly table entry.

10. The method of claim 8, further comprising:

updating, by the prediction module, the learned model to account for at least one of an age of the processing system, a degradation in processing system performance, and a processing system wear-out condition.

11. The method of claim 8, wherein the known anomaly classes includes an exceeded threshold, an outlier, a processing system degradation, a processing system failure, a thermal trip, a fan failure, a fan rotor lock, a processor throttling, a dust clogged heat-sink, an inlet vent obstruction, a thermal grease degradation, a laptop base feet removal/imbalance, a processing system performance degradation, a sub-optimal processing system-performance/system-loading event, a power over/under current event, and a high/low system load condition.

12. The method of claim 8, further comprising:

determining, by the prediction module, the estimate of the fan speed using the processor temperature and the processor utilization based on the prediction algorithm and the learned model, wherein the prediction algorithm includes a multi-variant least square algorithm;

wherein:

determining the significance further includes utilizing fan speed outlier information and fan speed threshold information from the first sensor data history;

the first sensor data history includes a fan sensor data history; and determining that the anomaly table entry has the known anomaly class for the clogged heat-sink is further based on the fan speed, the processor temperature, the processor utilization, and the known anomaly classes in the anomaly table.

13. A method comprising:

providing, by a processing system of an information handling system, first sensor data from a first sensor of the processing system to a management system of the information handling system;

providing, by the processing system, second sensor data from a second sensor of the processing system to the management system;

determining, by a prediction module of the management system, based on a prediction algorithm and a learned model of a learned model table entry associated with the processing system, an estimate of a first value of the first sensor data using a second value of the second sensor data;

determining, by the prediction module, a residual of the first value by a comparison of the estimate to the first value;

determining, by the prediction module, a significance of the residual, based on the learned model and a first sensor data history of the learned model table entry, wherein the significance having a significant value is associated with a predicted anomaly;

determining, by the prediction module, that an anomaly table entry in an anomaly table has a known anomaly class for the predicted anomaly, based on the first value, the second value, and known anomaly classes in the anomaly table, in response to the significance having a significant value;

performing, by the prediction module, a remediation plan of the anomaly table entry to resolve the predicted anomaly in response to determining the known anomaly class, wherein the remediation plan in the anomaly table entry is one of a plurality of remediation plans in the anomaly table, wherein the remediation plan includes at least one of: a heat-sink dust removal process; an inlet vent clearing process; and a re-application of heat-sink thermal grease; and wherein the remediation plan further includes: a fan replacement; a replacement/balancing of laptop base feet; and a device replacement; and determining, by the prediction module, an estimate of a fan speed using a processor temperature and a processor utilization based on the prediction algorithm and the learned model, wherein the prediction algorithm includes a multi-variant least square algorithm;

wherein:
- determining the significance further includes utilizing fan speed outlier information and fan speed threshold information from the first sensor data history; and
- the first sensor data history includes a fan sensor data history.

14. The method of claim 13, further comprising:
defining, by the prediction module, a new anomaly class for the predicted anomaly in response to determining that the predicted anomaly has an unknown anomaly class;
adding, by the prediction module, the new anomaly class to a new anomaly table entry in the anomaly table; and
adding, by the prediction module, a severity and a remediation plan to the new anomaly table entry.

15. The method of claim 13, further comprising:
updating, by the prediction module, the learned model to account for at least one of an age of the processing system, a degradation in processing system performance, and a processing system wear-out condition.

16. The method of claim 13, wherein the known anomaly classes includes an exceeded threshold, an outlier, a processing system degradation, a processing system failure, a thermal trip, a fan failure, a fan rotor lock, a processor throttling, a dust clogged heat-sink, an inlet vent obstruction, a thermal grease degradation, a laptop base feet removal/imbalance, a processing system performance degradation, a sub-optimal processing system-performance/system-loading event, a power over/under current event, and a high/low system load condition.

17. The method of claim 13, further comprising:
receiving, by the management system, third sensor data from a third sensor of the processing system, wherein the first sensor data includes a fan speed of a fan, the second sensor data includes a processor temperature of a processor, the third sensor data includes a processor utilization of the processor, and the predicted anomaly includes a clogged heat-sink,
wherein determining that the anomaly table entry has the known anomaly class for the clogged heat-sink is further based on the fan speed, the processor temperature, the processor utilization, and the known anomaly classes in the anomaly table.

* * * * *